US012812451B2

(12) United States Patent
Bangolae et al.

(10) Patent No.: US 12,812,451 B2
(45) Date of Patent: Nov. 24, 2026

(54) SUPPORT FOR QUALITY OF SERVICE IN RADIO ACCESS NETWORK-BASED COMPUTE SYSTEM

(71) Applicant: INTEL CORPORATION, Santa Clara, CA (US)

(72) Inventors: Sangeetha Bangolae, Portland, OR (US); Zongrui Ding, Portland, OR (US); Sudeep Palat, Cheltenham (GB); Alexandre Saso Stojanovski, Paris (FR); Qian Li, Portland, OR (US); Youn Hyoung Heo, Seoul (KR); Thomas Luetzenkirchen, Taufkirchen (DE); Ching-Yu Liao, Portland, OR (US); Abhijeet Kolekar, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 55 days.

(21) Appl. No.: 18/567,907

(22) PCT Filed: Aug. 11, 2022

(86) PCT No.: PCT/US2022/040123

§ 371 (c)(1),
(2) Date: Dec. 7, 2023

(87) PCT Pub. No.: WO2023/018910

PCT Pub. Date: Feb. 16, 2023

(65) Prior Publication Data

US 2024/0276290 A1 Aug. 15, 2024

Related U.S. Application Data

(60) Provisional application No. 63/233,156, filed on Aug. 13, 2021.

(51) Int. Cl.
*G06F 9/48* (2006.01)
*G06F 11/34* (2006.01)
(Continued)

(52) U.S. Cl.
CPC ...... *H04W 28/0268* (2013.01); *G06F 9/4843* (2013.01)

(58) Field of Classification Search
CPC .............. H04W 28/0268; G06F 9/4843; G06F 2209/509; G06F 9/5027
See application file for complete search history.

(56) References Cited

U.S. PATENT DOCUMENTS 10,285,090 B2 * 5/2019 Hou ........................ H04L 45/66
10,952,230 B1 * 3/2021 Pan .................. H04W 28/0268
(Continued)

FOREIGN PATENT DOCUMENTS

CN 106162744 B * 1/2021 ............ H04W 72/23
KR 10-2021-0026171 A 3/2021
(Continued)

*Primary Examiner* — Umar Cheema
*Assistant Examiner* — Golam Mahmud
(74) *Attorney, Agent, or Firm* — Gray Ice Higdon, PLLC

(57) ABSTRACT

This disclosure describes systems, methods, and devices related to RAN compute QoS modeling. A device may decode a compute task request message received from a user equipment (UE), the compute task request message comprising an indication of a compute task to be offloaded to the RAN and data of the compute task. The device may establish a RAN compute service function (SF) based on support initiated by a service orchestration and chaining function (SOCF). The device may establish a RAN compute bearer based on RAN compute QoS flow with the UE, wherein the RAN compute QoS flow spans between the UE, the RAN, and the RAN compute SF.

20 Claims, 10 Drawing Sheets

(51) Int. Cl.

| | |
|---|---|
| ***H04L 12/14*** | (2024.01) |
| ***H04L 29/08*** | (2006.01) |
| ***H04W 28/02*** | (2009.01) |
| ***H04W 40/24*** | (2009.01) |

(56) References Cited

U.S. PATENT DOCUMENTS 11,109,262 B2 * 8/2021 Pan .......................... H04L 47/24
11,139,991 B2 * 10/2021 Doshi ................. G06F 11/3433
2007/0283349 A1 * 12/2007 Creamer ............... G06F 9/5061 718/100
2017/0142206 A1 * 5/2017 Kodaypak ........... H04L 12/1407
2017/0337091 A1 * 11/2017 Liu ....................... G06F 9/5027
2018/0176886 A1 * 6/2018 Kodaypak ............. H04W 76/10
2018/0332494 A1 11/2018 Hou
2019/0116518 A1 * 4/2019 Stojanovski ............ H04L 67/14
2020/0142735 A1 5/2020 Maciocco et al.
2020/0280872 A1 * 9/2020 Fiorani ................. H04W 28/24
2020/0404069 A1 * 12/2020 Li ........................... H04L 67/59
2021/0045187 A1 2/2021 Sun et al.
2021/0105338 A1 * 4/2021 Oyman ............... H04L 12/2876
2021/0258385 A1 * 8/2021 Wang ...................... H04L 67/30

FOREIGN PATENT DOCUMENTS

WO WO-2020072155 A1 * 4/2020 ........... G06F 9/5027
WO 2021-127710 A2 6/2021

* cited by examiner

SUPPORT FOR QUALITY OF SERVICE IN RADIO ACCESS NETWORK-BASED COMPUTE SYSTEM

CROSS-REFERENCE TO RELATED APPLICATION(S)

This application is a U.S. National Stage Application under 35 U.S.C. 371 and claims the priority benefit of International Application No. PCT/US2022/040123, filed Aug. 11, 2022, and U.S. Provisional Application No. 63/233,156, filed Aug. 13, 2021, the disclosures of which are incorporated herein by reference as if set forth in full.

TECHNICAL FIELD

This disclosure generally relates to systems and methods for wireless communications and, more particularly, to support for quality of service (QOS) in radio access network (RAN)-based compute system.

BACKGROUND

The use and complexity of wireless systems, which include 4$^{th}$ generation (4G) and 5$^{th}$ generation (5G) networks among others, have increased due to both an increase in the types of user equipment (UEs) using network resources as well as the amount of data and bandwidth being used by various applications, such as video streaming, operating on these UEs. With the vast increase in the number and diversity of communication devices, the corresponding network environment, including routers, switches, bridges, gateways, firewalls, and load balancers, has become increasingly complicated, especially with the advent of next-generation (NG) (or new radio (NR)) systems. As expected, several issues abound with the advent of any new technology.

DETAILED DESCRIPTION

Figure 1:
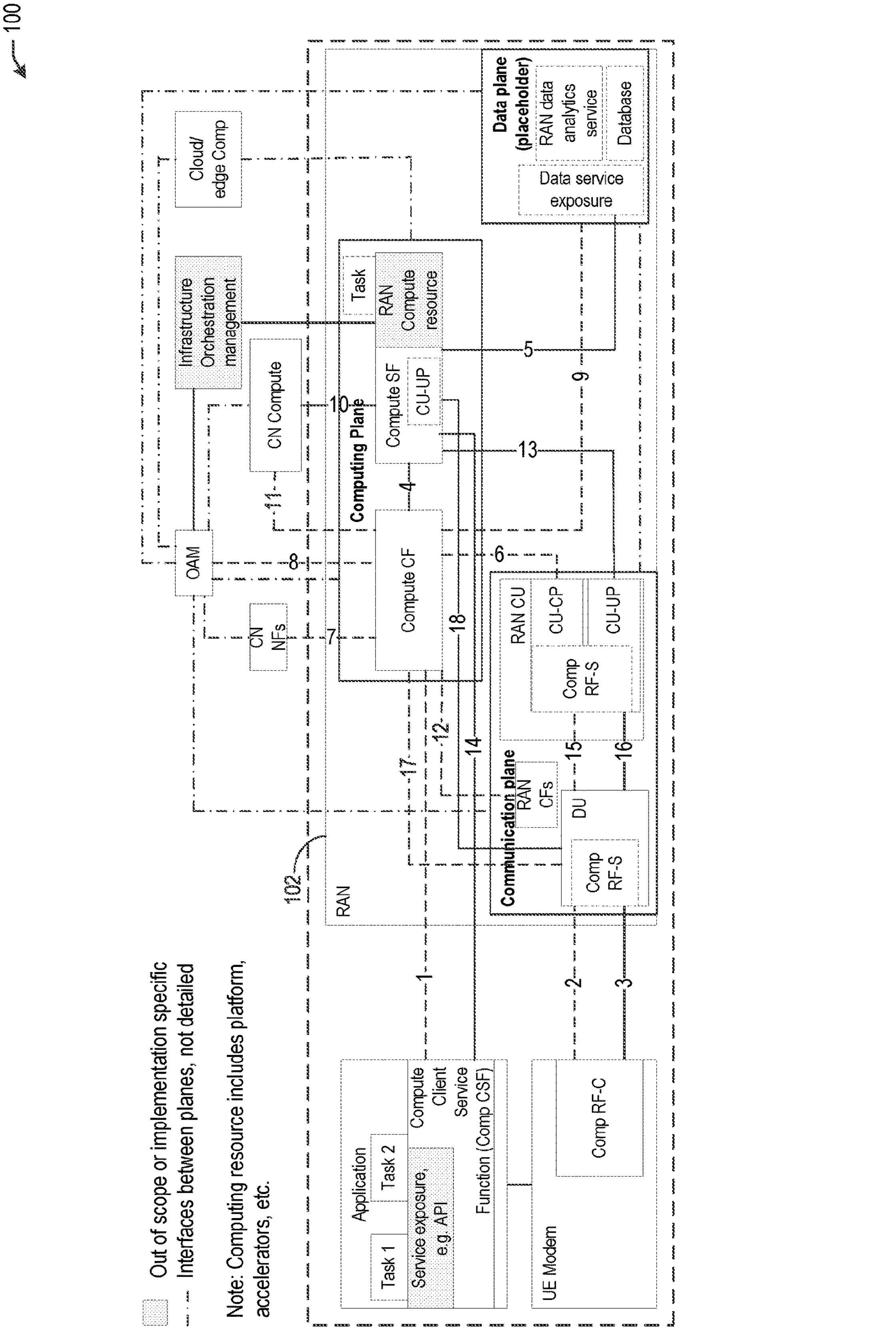
FIG. 1 illustrates an architecture to enable augmented computing in a radio access network (RAN), in accordance with one or more example embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Modern cloud computing has become extremely popular to provide computing/storage capability to customers who can focus more on the software (SW) development and data management without worrying too much about the underlying infrastructure. Edge computing is believed to extend this capability close to the customers to optimize performance metrics such as latency. The 5G architecture design takes these scenarios into consideration and developed a multi-homing, ULCL (Uplink Classifier) framework to offload compute tasks to different data networks (DNs), which may be at the network edge. For the UE with limited computing capabilities, the application can be rendered at the cloud/edge for computing offloading based on application level logic above the operating system (OS).

A key element of a wireless communications system that uses radio links to connect individual devices to other areas of a network is called a radio access network (RAN). Over a fiber or wireless backhaul connection, the RAN connects user devices, such as a cellphone, computer, or any remotely operated machine. That connection leads to the core network, which controls subscriber data, location, and other things.

The need for RANs is now growing quickly as more edge and 5G use cases for telco customers become apparent. RANs are critical connection sites for telecommunications network operators and represent major total network expenses. They also perform heavy and complicated processing.

Similar concepts can be used to RAN, just as the virtualization of network operations has allowed telcos to update their networks. This is crucial since the industry's future depends on the shift to 5G or 6G; in reality, the transformation of the 5G or 6G networks, frequently relies on the virtualization of the RAN and increasingly presumes that it is cloud-native and container-based.

With the trend of telecommunications network cloudification, the cellular network is foreseen to be built with flexibility and scalability by virtualized network functions (VNFs) or containerized network functions (CNFs) running on general-purpose hardware. Heterogenous computing capabilities provided by hardware and software, naturally coming with this trend, can be leveraged to provide augmented computing to end devices across devices and networks. These computing tasks generally have different requirements in resources and dependencies in different scenarios. For example, it can be an application instance either standalone or serving one or more UEs. It can also be a generic function like artificial intelligence (AI) training or inference or a micro-service function using specific accelerators. In addition, the computing task can be semi-static or dynamically launched. To enable these scenarios, this disclosure proposes solutions to support QoS for augmented computing across the device and RAN in order to dynamically offload workloads and execute compute tasks at the network computing infrastructure with desired QoS characteristics e.g. low latency.

Example embodiments of the present disclosure relate to systems, methods, and devices for RAN Compute QoS architecture and modeling, for example, RAN Compute QoS parameters, mapping of Compute QoS flows, and possible assistance information.

There are no previous solutions to address QoS for transport of augmented RAN-based computing and dynamic workload migration in the cellular network. Additionally, there are no previous solutions to address RAN-based compute QoS.

To enable augmented computing as a service or network capability in 6G networks, compute client service function (Comp CSF) at the UE side, compute control function (Comp CF) and compute service function (Comp SF) at the RAN network side are defined and known as "compute plane" functions to handle computing related control and user traffic. The compute task generated at the UE/Comp CSF needs to be transported to the RAN Comp SF by satisfying a specific QoS guarantee. QoS modeling and related parameters/characteristics including methods to map the compute QoS flows in uplink and downlink are defined herein. There are several advantages of supporting QoS modeling specific to RAN-based computing including but not limited to 1) RAN-based computing is a new paradigm using the same framework compared to the traditional 5G QoS model defined between UE and core network; 2) Compute tasks might have stricter latency bounds and newer QoS-related needs and correspondingly a separate QoS modeling architecture is to be defined for better QoS support.

Various embodiments herein enable cellular network-based computing scenarios and require computing and storage capability on a large scale.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an architecture to enable augmented computing in a radio access network (RAN), in accordance with one or more example embodiments of the present disclosure.

Refer referring to FIG. 1, there is shown a Detailed RAN Architecture with Computing Functions to enable augmented computing in RAN.

As shown in FIG. 1, the overall architecture of RAN is inside box 102 and consists of a communication plane, computing plane, and data plane. The functions proposed to enable network computing are RAN computing client service function (Comp CSF) at the UE side, the RAN computing control function (Comp CF) and the RAN computing service function (Comp SF) at the network side.

The reference points in FIG. 1 are: 1) between RAN Comp client and RAN Comp CF, 2) between the UE and the RAN distributed unit (DU), 3) between the UE and the DU, 4) between the RAN Comp CF and SF, 5) between the RAN Comp SF and the data plane, 6) between the RAN Comp CF and the RAN centralized unit control plane (CU-CP) or user plane (CU-UP), 7) between the RAN Comp CF and CN network functions (NFs), e.g. NEF, PCF, AMF, 8) between the RAN Comp CF and the Operations, Administration and Maintenance (OAM), 9) between the RAN Comp CF and the data plane, 10) between the RAN Comp SF and the CN Comp SF, 11) between the RAN Comp CF and the CN Comp CF, 12) between the RAN Comp CF and the RAN CF, e.g., NEF, PCF, NNW, 13) between the RAN Comp SF and the RAN CU-CP or CU-UP, 14) between the RAN Comp Client and the RAN Compute SF, 15) between the RAN DU and the RAN CU-CP, 16) between the RAN DU and the RAN CU-UP, 17) between the RAN DU and the RAN Comp CF, and 18) between the RAN DU and the RAN Comp SF. Reference points 1 and 14 are logical and are be mapped to a combination of other reference points.

It is understood that the above descriptions are for purposes of illustration and are not meant to be limiting.

Figure 2:
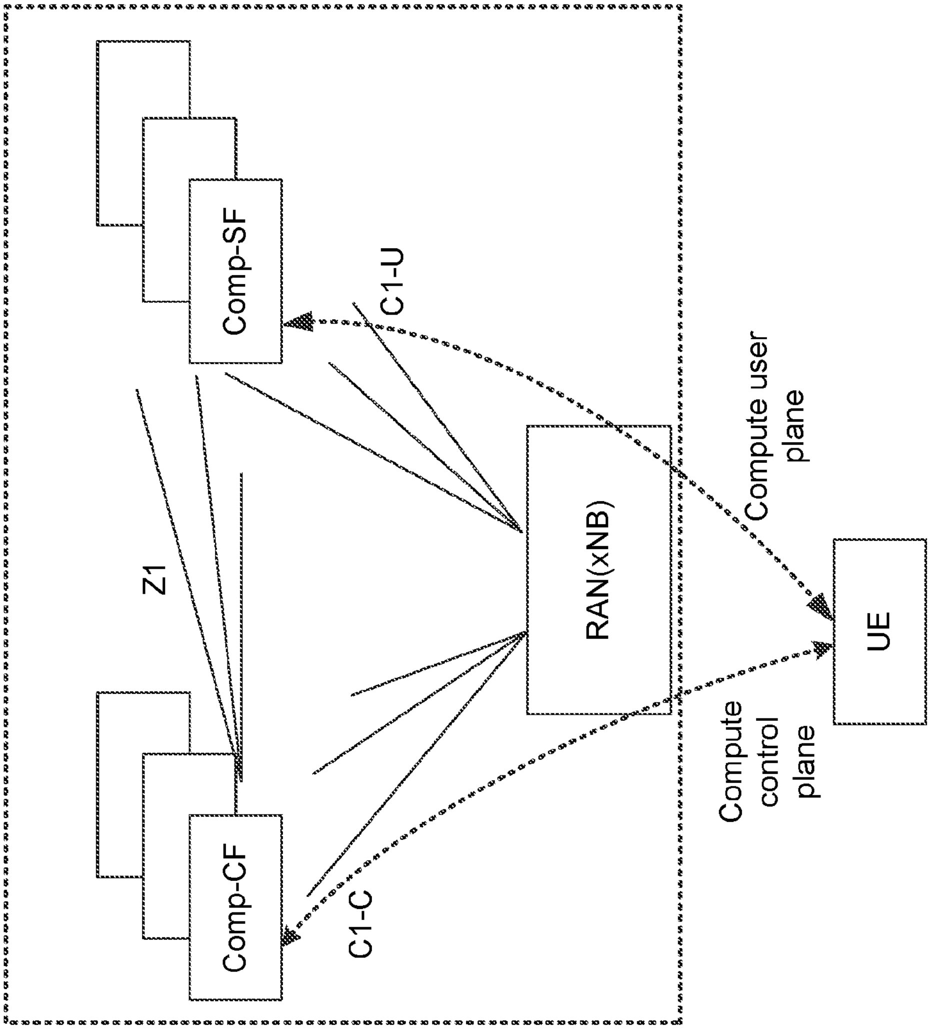
FIG. 2 illustrates an architecture specific for RAN and its high-level relationship to computing functions, in accordance with one or more example embodiments of the present disclosure.

FIG. 2 illustrates an architecture specific for RAN and its high-level relationship to computing functions, in accordance with one or more example embodiments of the present disclosure.

Referring to FIG. 2, it can be seen that a given xNB may have connectivity using interface C1 to Compute CF (Control) and Compute SF (Service) functions. The dotted box around these entities indicates that the compute functions may be collocated with the xNB.

As part of the dynamic distribution of compute intensive workload between UE and Network, a transport protocol design for offloading compute intensive workload over the user plane and control plane was considered for collocated and non-collocated scenarios. A corresponding RAN compute session establishment procedure for support of IP and Non-IP based radio interface protocol design was also defined. In various embodiments herein, assuming the same baseline, the QoS modeling for this architecture is defined.

Figure 3:
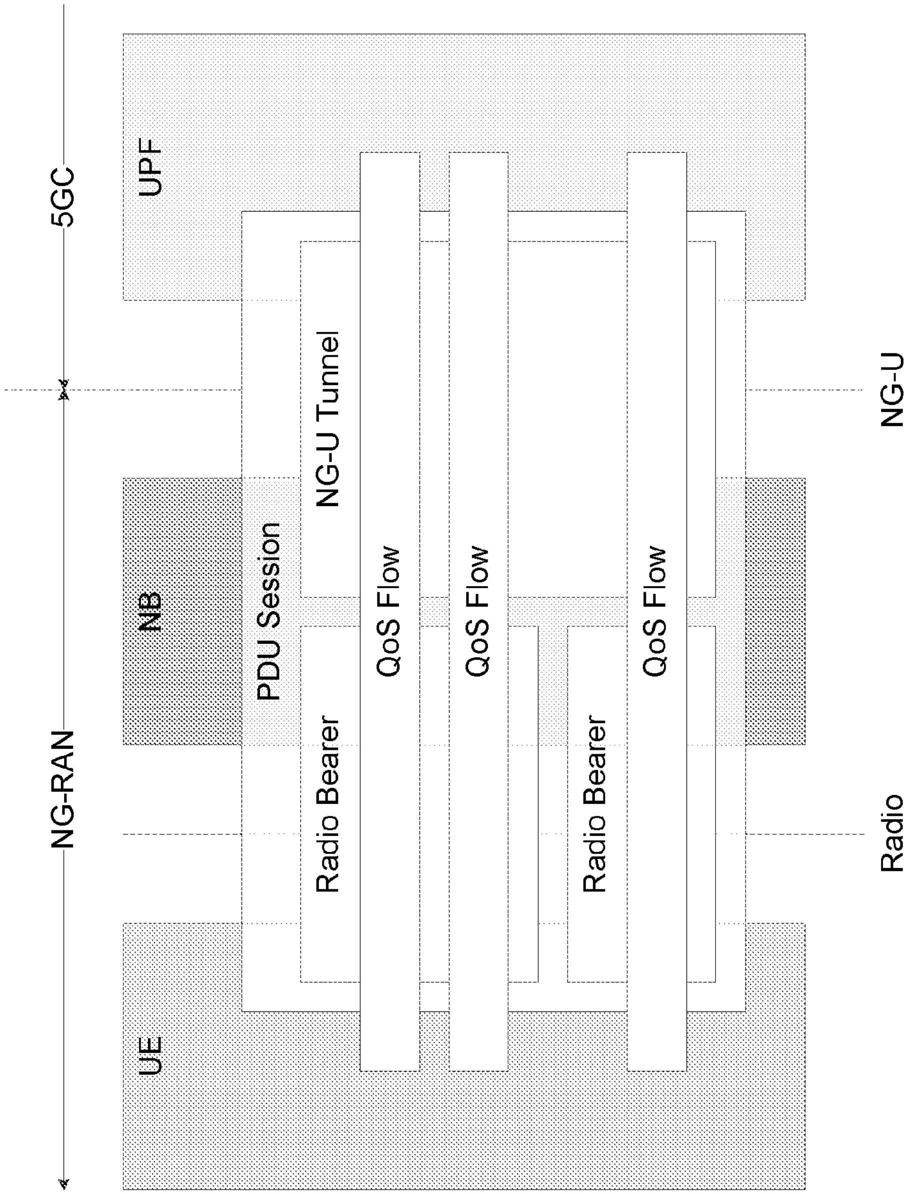
FIG. 3 depicts an illustrative schematic diagram for QoS modeling in 3GPP 5G core (5GC) architecture, in accordance with one or more example embodiments of the present disclosure.

FIG. 3 depicts an illustrative schematic diagram for QoS modeling in 5GC architecture, in accordance with one or more example embodiments of the present disclosure.

Referring to FIG. 3, there is shown an overview of the 5G QoS model (between UE and core network component, UPF), a PDU session consists of multiple QoS flows each of which is identified by a QoS flow ID (QFI) carried in the header. At the NAS level, the QoS flow is the finest granularity of QOS differentiation in a PDU session. The end-to-end QoS architecture is shown in FIG. 3. As can be seen here, each PDU session is made up of multiple radio bearers (different PDU sessions belong to different radio bearers), and one radio bearer may encompass multiple QoS flows that share similar QoS characteristics.

There are also GBR (Guaranteed Bit Rate) and non-GBR QoS flows depending on whether some of the flows need further QoS parameters (like bit rate) to be fulfilled.

The core network is responsible for providing the UE with QoS flow with QoS profile and QoS rules. The QoS profile is used by NG-RAN to determine the treatment on the radio interface while the QoS rules dictate the mapping between uplink User Plane traffic and QoS flows to the UE. The QoS profile of a QoS flow contains QoS parameters, for instance, these could include for each QoS flow 1) a 5G QOS Identifier (5QI), and/or 2) an Allocation and Retention Priority (ARP).

The 5QI is associated with QoS characteristics giving guidelines for setting node specific parameters for each QoS Flow. Standardized or pre-configured 5G QoS characteristics are derived from the 5QI value and are not explicitly signaled. Signaled QoS characteristics are included as part of the QoS profile. The QoS characteristics comprise: 1)

Priority level; 2) Packet Delay Budget (including Core Network Packet Delay Budget); 3) Packet Error Rate; 4) Averaging window; and/or 5) Maximum Data Burst Volume.

At the Access Stratum level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (e.g. QoS parameters and QoS characteristics). Separate DRBs may be established for QoS flows requiring different packet forwarding treatments, or several QoS Flows belonging to the same PDU session can be multiplexed in the same DRB.

Throughout this disclosure, xNB or gNB refers to the base station or a RAN node such as gNB or NG-RAN in the case of 5G architecture or next generation cellular network. All of the discussions still apply to different architectures of the xNB correspondingly depending on the split architecture assumed for future cellular generation RAN nodes.

The description of various embodiments may assume that Comp-CF and Comp-SF are new functions designed for computation in the RAN nodes, e.g. gNB, xNB. For simplicity, gNB is denoted to represent existing protocol stacks for communication as indicated in the 3GPP 38 series of specifications, e.g., TS38.300, TS38.331, TS38.321, etc. Specific reference to 'RAN Compute' can be generalized to mean any Compute or similar group of applications that utilize resources or services located at the RAN node to enhance the user experience.

All the compute functions are named for ease of usage and may be referenced differently in the future/actual specifications. The service orchestration and chaining function (SOCF) is defined to handle service orchestration and chaining in RAN or CN such as allocating computing resources and functions, e.g., Comp CF/SF.

Figure 4:
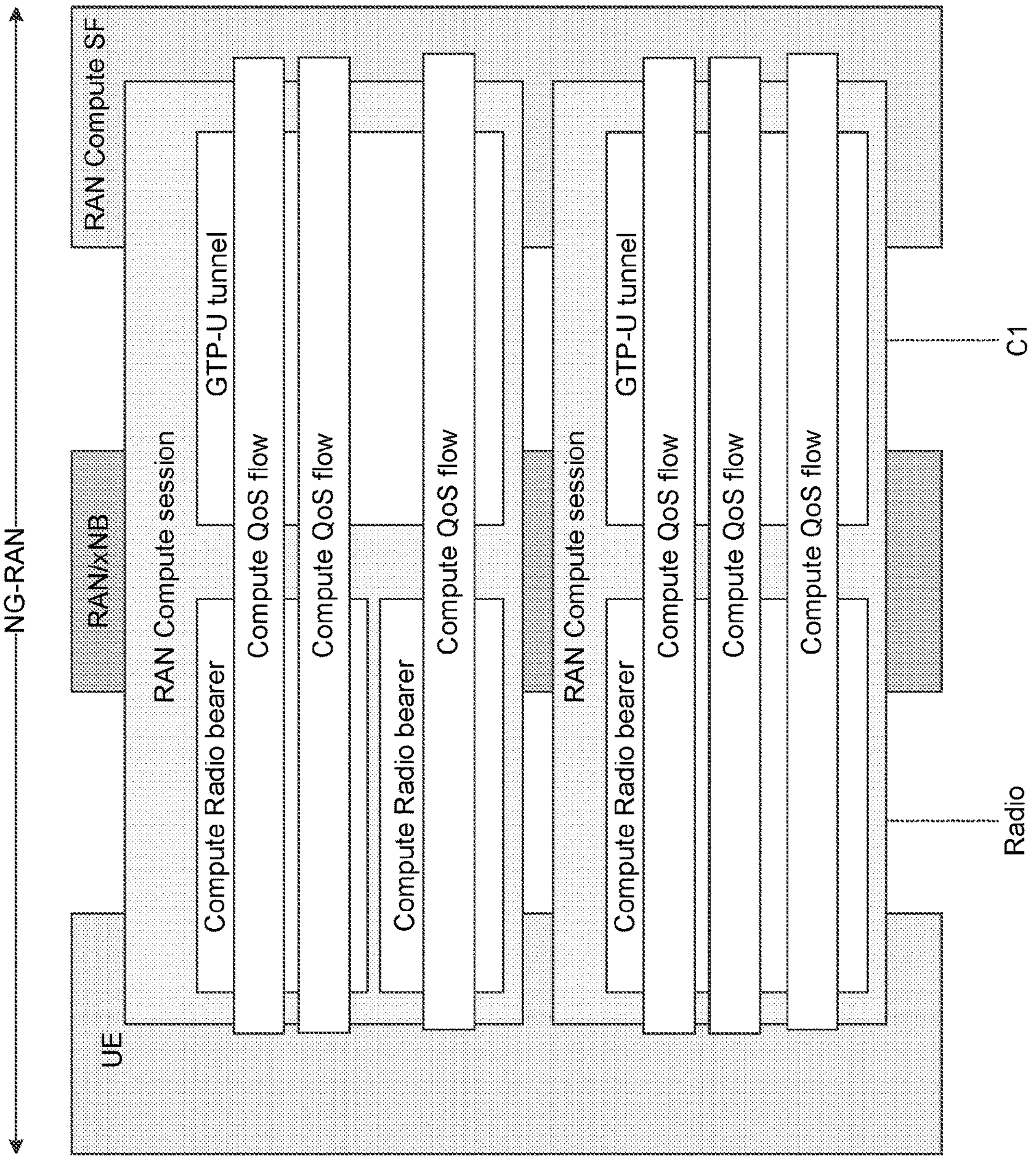
FIGS. 4-6 depict illustrative schematic diagrams for RAN compute QoS modeling, in accordance with one or more example embodiments of the present disclosure.
Figure 5:
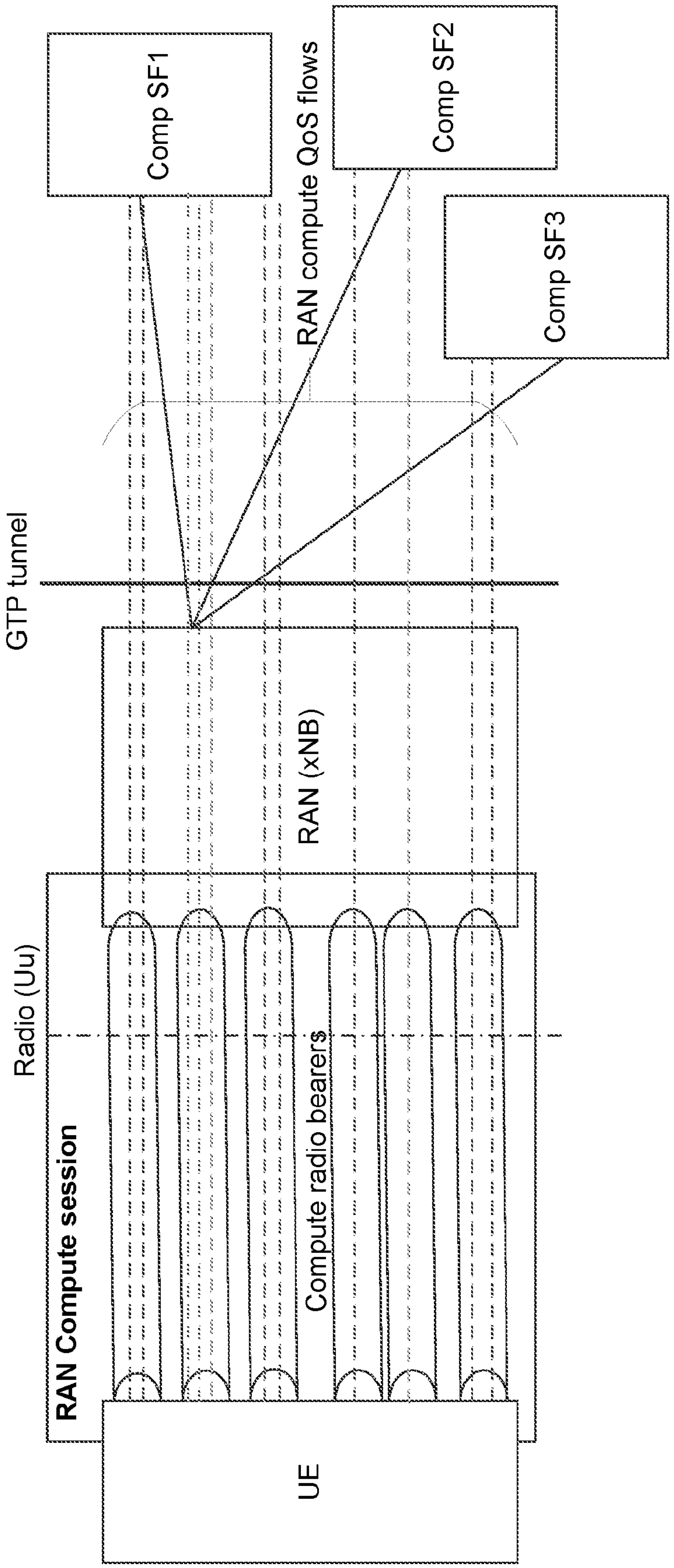
Figure 6:
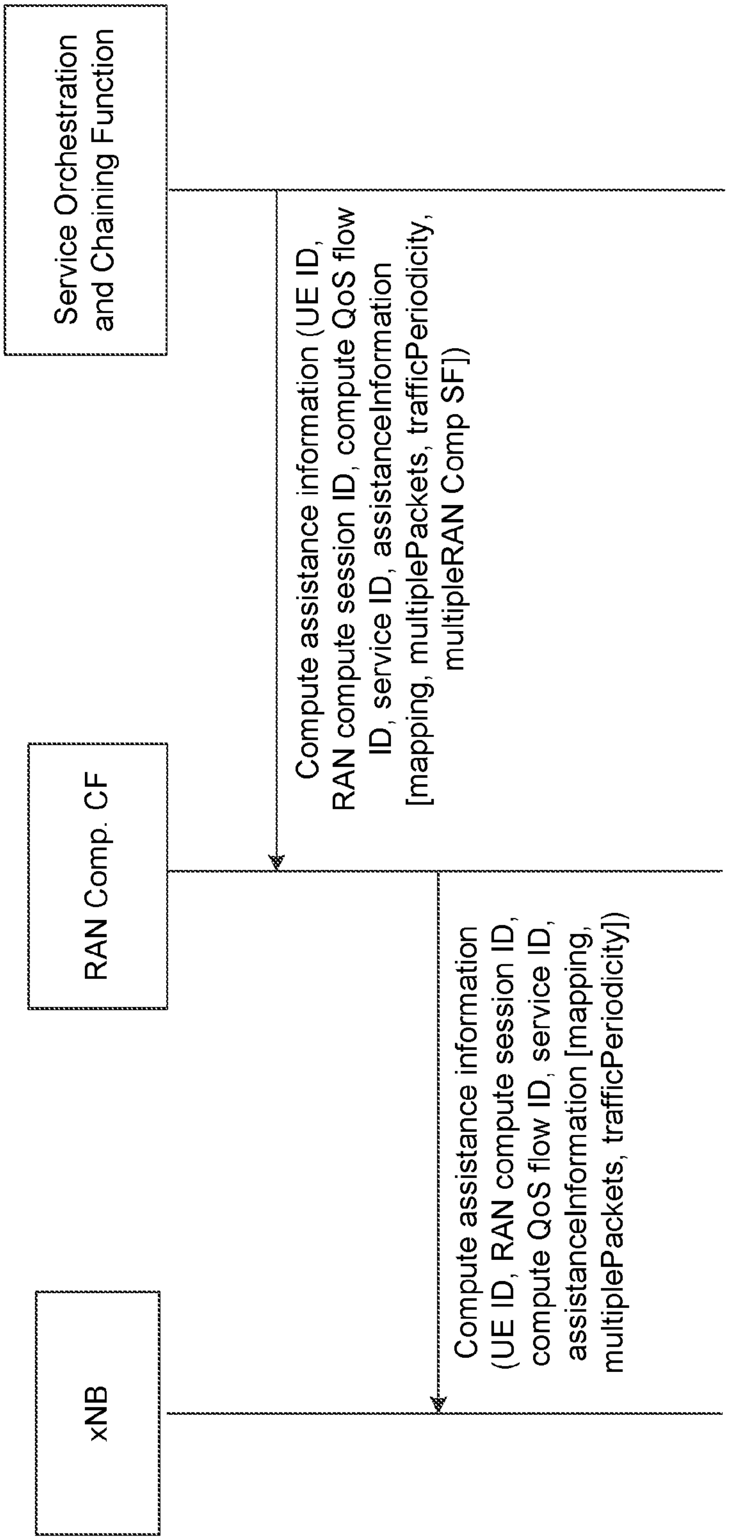

FIGS. 4-6 depict illustrative schematic diagrams for RAN compute QoS modeling, in accordance with one or more example embodiments of the present disclosure.

In one or more embodiments, a RAN compute QoS modeling system may facilitate QoS modeling support and requirements for RAN Compute. RAN Compute session is established to support compute offloading for UEs that obtain/utilize compute resources for any of their applications (e.g. video camera, XR/VR, etc) from RAN (xNB). As shown in FIG. 2, RAN has compute functions either collocated or non-collocated, and connected to the compute function with an interface, C1. Each of the applications may support different QoS characteristics and thereby require different QOS treatments over the air interface and potentially over C1.

Considering different QoS requirements, a RAN compute QoS modeling system may support a QoS model for the RAN compute architecture similar to the 5GC architecture with notable differences highlighted herein. The NAS protocol/NAS layer is not discussed in this RAN-based modeling, as the core network is generally not involved in support of RAN compute except in terms of initial authorization, subscription and charging policy framework.

The RAN compute QoS requirements can be defined for guaranteed quality only or for both guaranteed and non-guaranteed quality. Similar to the 5G QoS system, the QoS modeling in RAN compute is based on RAN Compute-QoS Flow Identifier defined by RC-QFI (as an example) to support guaranteed quality RC-QoS flows and non-guaranteed quality accordingly. The packets within the QoS flows are identified by the RC-QFI and in general, user plane traffic with the same RC-QFI within a RAN compute session receives the same traffic forwarding treatment with respect to scheduling and admissions control. The RC-QFI is carried in the packet header and recognized by both the RAN xNB and RAN Comp SF. As such, the RC-QFI is unique within a RAN compute session (considering both options 1 and 2 below) and can be assigned dynamically or equal to the RAN Compute QoS Identifier RCQI defined below.

An RC-QoS flow is controlled by the SOCF or RAN Comp CF or relevant function within the RAN and established via the RAN Compute session establishment/modification procedure. It can be configured as a non-guaranteed quality flow with a default Compute specific QoS rule for the corresponding RAN Compute session and remains established as long as the lifetime of the RAN compute session.

In one or more embodiments, any RAN Compute QoS flow is characterized by: 1) a Compute QoS profile discussed below provided by the SOCF/CF to the RAN/xNB via the C1 or similar interface; 2) certain Compute related QoS rules and optionally Compute QoS flow parameters associated with these rules further discussed below; and/or 3) one or more UL and DL packet detection rules also provided by the SOCF or RAN Comp CF to the RAN Comp SF.

In one or more embodiments, a compute QoS flow is associated with QoS requirements as specified by the QoS parameters and QoS characteristics further discussed below. The QoS characteristics corresponding to the guaranteed quality may be further classified as follows:

- Type of guarantee to be provided (e.g. None for default or non-guaranteed quality, or priority+any of the other characteristics, or priority+some/all).
- Rate guarantee for a specific maximum average bit rate support specifying separate end-to-end threshold values for uplink and downlink.
- Delay guarantee for delay-critical service specifying an end-to-end delay threshold.
- Packet loss guarantee for reliable service specifying an end-to-end packet loss threshold.
- Priority-based guarantee wherein the priority is considered before other aspects are considered. When there is congestion or shortage of resources, the xNB node can use the priority of the QoS flows to choose which QoS flow to treat before others. The lowest priority value corresponds to the highest priority. If no other parameters are set, at least the priority needs to be specified for all the QoS flows so that the traffic can be treated accordingly. Others, such as packet error rate, maximum data burst volume, Time Sensitive Communication (TSC) Assistance Information (TSCAI) burst arrival, and burst periodicity may also be considered.

An averaging window may be specified where applicable for cases where the service extends over a period of time and the above guarantees are applied over the course of the window (especially the rate is calculated using this window). In general, it is expected that the RAN Compute communication to include request/response type of messages that need to have the QoS guarantee over that one message exchange; however, if the QoS flow exists for a longer duration, then the averaging window might be utilized for QoS provisioning as well.

These QoS characteristics are used as guidelines for setting node-specific parameters for each RAN compute QoS flow (e.g. at RAN/xNB and Compute SF/CF or Orchestration Function). Each of these characteristics may be indicated using a QoS parameter further discussed below. Unless otherwise mentioned, it is assumed that both UL and DL have the same QoS characteristics.

5G QoS parameters such as 5QI (5G QoS Identifier), ARP (Allocation and Retention Priority), RQA (Reflective QoS Attribute) can be applied as is for RAN Compute QoS.

One example modification can be a new definition of different QOS Identifiers that are RAN-specific and defined for RAN Compute services. RAN Compute QoS Identifier or RAN-based QoS Identifier (RCQI, RQI) may be utilized since this is RAN-based modeling and provisioned by a different function altogether. This identifier defines how the Compute session's QoS flow is treated by the RAN/xgNB (e.g. for scheduling, queue management, admission, etc.). The RCQI values may be standardized or defined dynamically by the corresponding function and provisioned to the UE/RAN along with the QoS profile. An example of the RCQI is shown below in Table 1.

TABLE 1

| RCQI value | Type | Default Priority Level | Packet Delay Budget | Packet Error Rate | Default Maximum Data Burst Volume | Default Averaging Window | Example Services |
|---|---|---|---|---|---|---|---|
| 1 | Guaranteed priority-based | 5 | 10 ms | $10^{-2}$ | N/A | 2000 ms | Video processing |

the compute QoS flows are mapped to GTP-U tunnels identified by different identifiers such as TEID, compute session ID, Comp SF's IP address, etc. The mapping rules and configuration at the xNB and UE are further illustrated as below.

At the AS level, service data adaptation protocol (SDAP) supports mapping the UL and DL compute QoS flows onto the specific RAN compute radio bearers according to the configuration provided by the xNB.

In one or more embodiments, a RAN compute QoS modeling system may facilitate mapping and packet identification at the xNB. In one example, for each compute session it is up to xNB to map the compute QoS flows to compute radio bearers. Once mapped, the xNB can identify the packets based on packet filters that can be provided by the RAN Compute CF or service orchestration and chaining function (SOCF) at the time of Compute session establishment to map the UL and DL packets onto the Compute QoS flows at the UE and RAN Compute SF respectively (e.g. using UE ID, session ID, compute QoS flow ID, RAN Comp SF ID . . . etc).

At RAN Compute session establishment, the RAN Comp CF/SOCF selects the RAN Comp SF to serve the particular service and provides the xNB with information pertaining to the QoS and tunnel ID information to reach the specific RAN Comp SF. In one example, the RAN Comp CF may also specify whether a 1:1 mapping of Compute QoS flow to radio bearer (and thereby enabling congestion control at the logical channel level) is recommended for better QoS control (e.g., rate control/adaptation). In general, the compute QoS flow to radio bearer mapping by xNB is based on the compute QoS flow Identifier and associated QoS parameters/characteristics. Separate compute radio bearers are established for different Compute QoS flows if different packet treatment over the air interface is expected across the Compute QoS flows. Mapping of multiple compute QoS flows although up to the xNB/RAN network, may take input information from the compute control function or the assistance information as will be discussed below.

In one example, in the downlink, the RAN compute QoS flow Identifier or RC-QFI may be signaled by the xNB to the UE for the purpose of utilizing the corresponding RC-QFI for uplink packets belonging to the same downlink packet flow and this is referred to in existing 5G architecture as reflective QoS.

In one or more embodiments, a RAN compute QoS modeling system may facilitate mapping and packet identification at the UE. At the UE, this may be achieved at the SDAP level as an additional functionality or at an abstract layer between the application and SDAP. It may also be up to UE implementation.

The SDAP adds the RAN Compute-specific QFI (QOS Flow Identifier) or CQFI or RC-QFI in the header to each packet for the xNB to identify and differentiate QoS. As discussed in [U.S. Provisional Patent Application No.

Another example modification is about which function is responsible for setting the QoS parameters for the QoS flows. The RAN Compute Control Function or the Service Orchestration and Chaining Function (SOCF) or both are responsible to provision these parameters to the RAN/xNB and the UE; these parameters may be set over the C1 interface or another interface at UE context establishment or RAN Compute session establishment or modification. The SOCF or the RAN Compute CF also provisions the QoS parameter notification control to the xNB (as part of the QoS profile for the compute QoS flow) to provide information on whether notifications are requested from the xNB when a given rate or QoS characteristic cannot be satisfied by the xNB for a given QoS flow or service during its lifetime.

In one or more embodiments, a RAN compute QoS modeling system may facilitate a QoS flow mapping to support RAN Compute session.

Each UE can establish one or more RAN compute sessions towards the RAN Comp SF through the xNB. There are two possible options:

Option 1: One compute session is established per RAN Compute SF. FIG. 4 shows the QOS architecture for RAN compute, where mapping in NG-RAN is shown of the compute session to compute QoS flow to compute radio bearer for QoS support.

Option 2: Multi-homing compute session with one compute session that can be hosted by multiple Comp SFs, which can be located in different logical networks. The routing at the xNB can similarly follow a packet filter to determine which Comp SF the computing traffic is destined to. Therefore, a QoS flow at the RAN can be mapped to a QoS flow at the compute SF based on the identifier similar to what is used for the packet filter in the CN. This is shown in FIG. 5.

As shown in FIG. 4, the compute traffic travels through the radio and the C1 interfaces. Over the air interface, the compute traffic belonging to different RAN compute sessions are mapped to different compute radio bearers. Even packets belonging to the same compute session may be mapped to a different compute radio bearer depending on the expected packet treatment on the radio interface. Over C1, 63/067,241], upon establishment of the RAN Compute session, xNB may configure the UE with corresponding configuration.

In one example, in the uplink at UE, the mapping of compute QoS flow to compute radio bearer is controlled by explicit configuration by RRC from the xNB. This can be based on assistance information from the RAN Comp CF/SF as well as the UE in some scenarios to provide the best possible QoS for certain compute traffic.

In another example, a default compute radio bearer may be configured such that if the mapping rule does not apply for a specific UL packet and if the UE is not specifically configured, it may utilize the default compute radio bearer for the RAN compute session.

In another example, the SDAP layer for mapping legacy QoS flows to DRBs may be adapted to support compute traffic; SDAP configuration may be provided by the xNB to the UE using dedicated signalling as part of radio bearer configuration containing at least the following information:

Presence of SDAP header for uplink and downlink, indication of default compute radio bearer (indicating whether this is a default radio bearer), RAN compute session ID, mapped compute QoS flows and the corresponding compute QoS flow Identifier.

A multi-homing RAN Compute session can be established between UE and the Comp SFs and the xNB can decide which Comp SF the compute traffic is headed to, so as to map into a corresponding GTP-U tunnel. In this case, besides the RAN compute session ID and RC-QFI, the identifier of the Comp SF may be needed at the xNB to determine the compute QoS flow mapping, which can be packet filter based for IP or non-IP traffic (ethernet). The configuration of the packet filter is similar to Option 1.

FIG. 5 shows the high-level architecture view of this option. Unlike Uu (traditional) scenario where one PDU session generally maps to one UPF, since it is sufficient to route to the specific application in the Internet through the UPF, depending on resource availability, different Comp SFs may be utilized to solve the incoming compute task. In order to ensure that a UE's compute task is always executed, one RAN compute session may thus be associated with multiple RAN Comp SFs.

In one example, at the RAN compute session establishment, multiple RAN Comp SF IDs as a list may be associated to the session ID and made available to the UE and the xNB by the SOCF/RAN Comp CF. In an extended example, in the uplink, the xNB uses the packet filters with the RAN Comp SF ID to filter and forward the QoS flows to the SFs associated with the flow belonging to the multi-homed session.

In another example, the xNB dynamically chooses to assign incoming compute task-based packet from a compute QoS flow onto one of the available RAN Comp SF and keeps track of the mapping of the packet and RAN Comp SF using the Comp SF ID associated to the corresponding QoS flow. In an extended example, the requirement of executing the computation on the same RAN Comp SF for the lifetime of the compute session can be specified as an option.

In one or more embodiments, a RAN compute QoS modeling system may perform QoS notification control/monitoring and use QoS mapping assistance information.

In a 5G system, the QoS parameter notification control is defined such that the NG-RAN can provide notifications when the guaranteed flow bit rate (GFBR) can be guaranteed or not for a QoS flow. This may be used if the application traffic is able to adapt to the change in the QoS by adapting its rate. The SMF indicates this parameter to the NG-RAN based on a rule bound to the QoS flow.

In one example, a notification control could be defined by the SOCF or the RAN Compute CF function to the xNB (as part of the QoS profile when a given compute QoS flow is established) in order to notify when any of the QoS characteristics that the compute QoS flow is meant to support can no longer be supported so that the corresponding application can adapt accordingly. This is also intended to aid in modification of necessary parameters/QoS flows so that the xNB can reconfigure the bearers of the QoS flow correspondingly. In an extended example, the xNB could monitor the QoS correspondingly and notify for example, when a given packet delay budget (PDB) for a compute QoS flow will not be satisfied (due to congestion or load balancing or other reason) by providing the compute session ID information along with the QoS flow information.

The QoS modeling including QoS parameters, and characteristics belonging to a QoS profile and corresponding sharing of this information from the responsible function/SOCF (Service Orchestration and Chaining Function) to the RAN and the mapping to radio bearer in the RAN have been discussed so far, primarily based on the existing 5G architecture applicable for Uu traffic carried to the core network with specific details applicable to RAN-based compute architecture. In addition to the generic QoS profile based information, any additional service-specific information, that may be beneficial in handling the traffic at the RAN with respect to scheduling, like assistance information can be considered as well.

In one example, the SOCF through the RAN Compute CF could provide compute-specific assistance information to the xNB for the following cases of QoS mapping:

1) If the given compute QoS flow is to be mapped to a compute radio bearer in a 1:1 fashion (mapping: 1:1 or m:1); 2) if multiple UL and DL data transmissions are to be expected for this QoS flow or is it a single exchange of request and response message type (e.g. in the case of sensor or video monitor updating or requesting some computation in the network) (multiplePackets: TRUE or FALSE); 3) expected periodicity of the traffic if known and the direction of the data (trafficPeriodicity) if known (optional); 4) information on whether different/multiple RAN Comp SF can be supported/utilized for the same RAN compute session or not (in cases where multi-homed session is established and supported); and/or 5) the packet filter provided to xNB to match a specific QoS flow to a Comp SF.

Referring to FIG. 6, there is shown a compute assistance information for support of compute QoS. As shown in FIG. 6, the SOCF or similar function passes the assistance information to the RAN Compute CF to be passed onto the xNB.

It is understood that the above descriptions and functions associated to RAN compute are for purposes of illustration and are not meant to be limiting.

Figure 7:
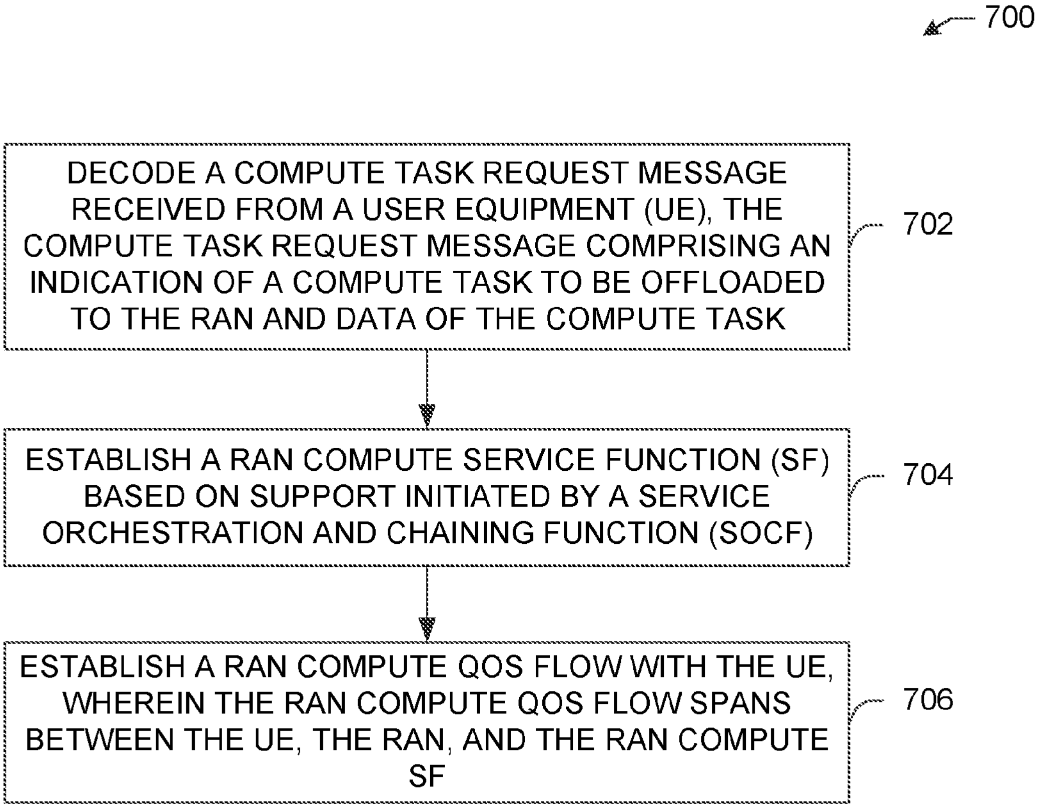
FIG. 7 illustrates a flow diagram of a process for an illustrative RAN compute QoS modeling system, in accordance with one or more example embodiments of the present disclosure.
Figure 8:
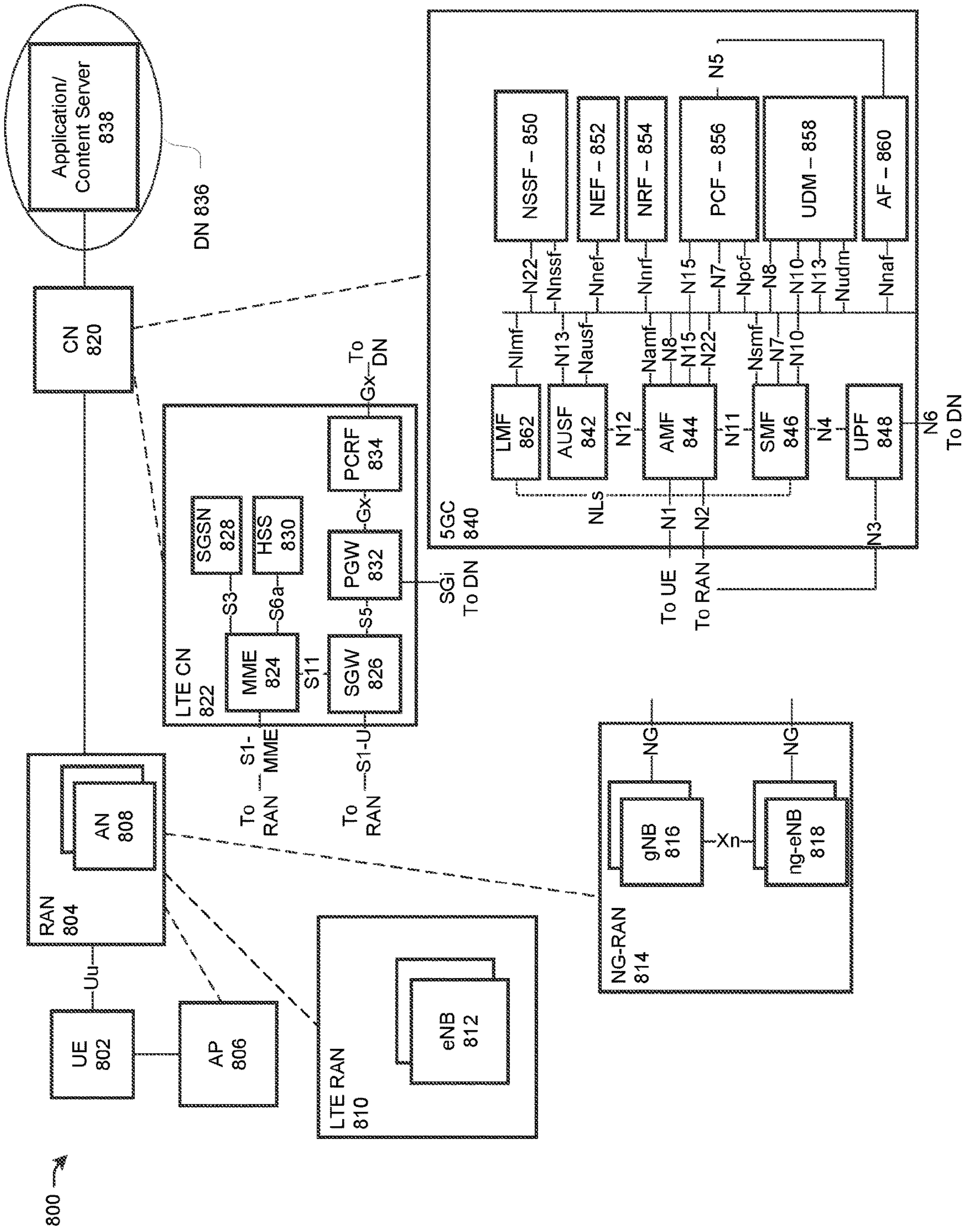
FIG. 8 illustrates an example network architecture, in accordance with one or more example embodiments of the present disclosure.
Figure 9:
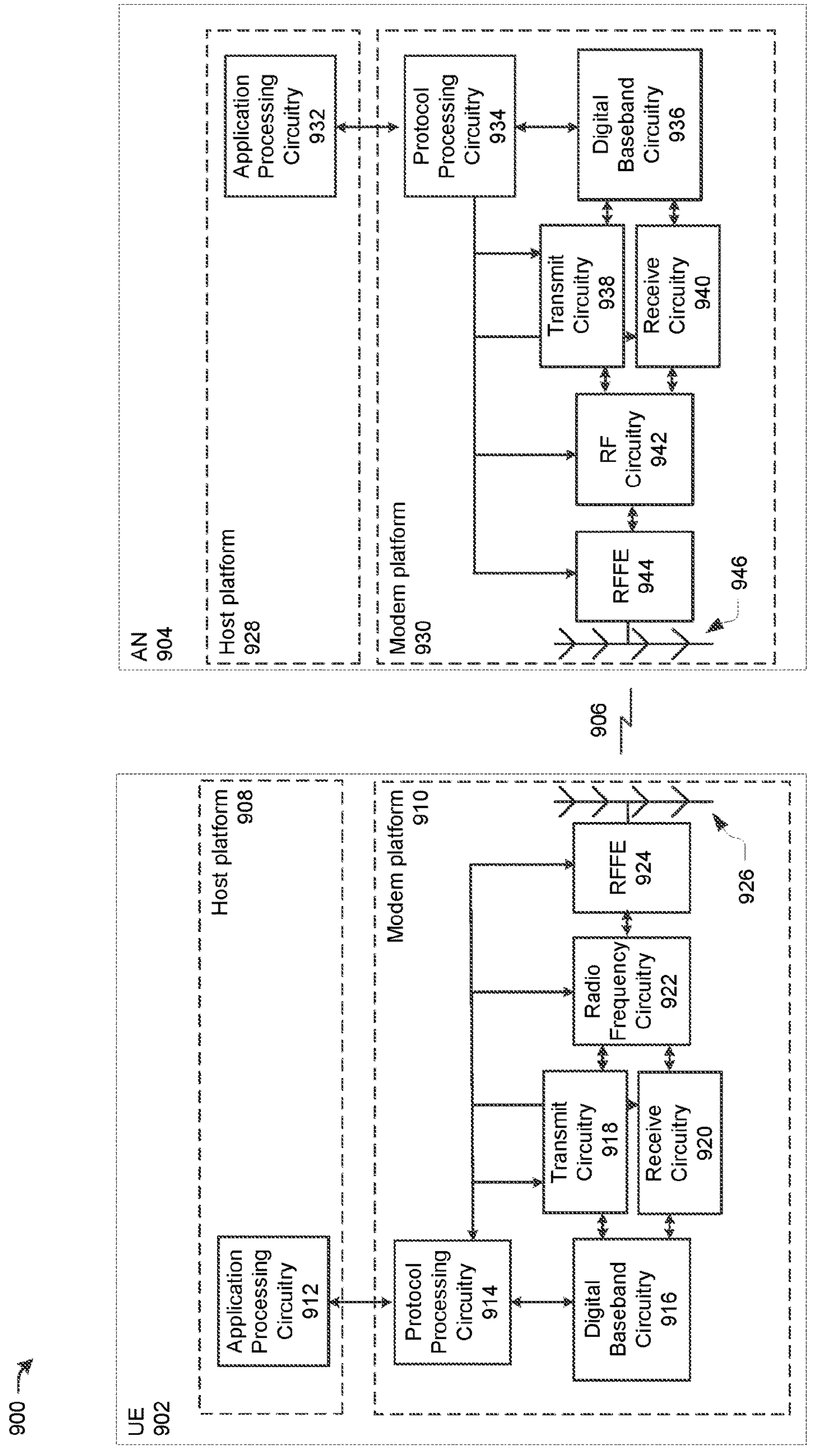
FIG. 9 schematically illustrates a wireless network, in accordance with one or more example embodiments of the present disclosure.
Figure 10:
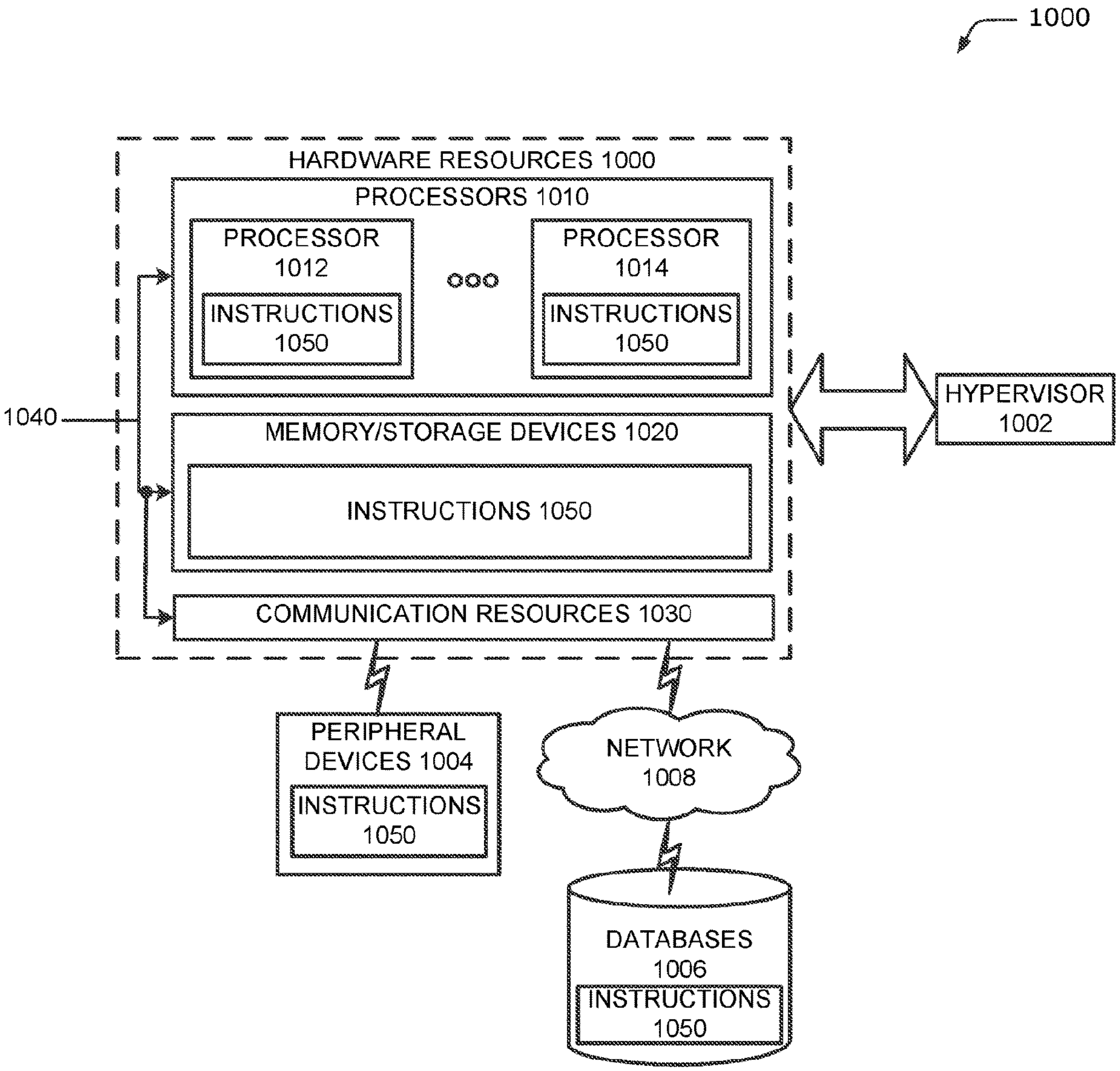
FIG. 10 illustrates components of a computing device, in accordance with one or more example embodiments of the present disclosure.

In some embodiments, the electronic device(s), network(s), system(s), chip(s) or component(s), or portions or implementations thereof, of FIGS. 8-10, or some other figure herein, may be configured to perform one or more processes, techniques, or methods as described herein, or portions thereof. One such process is depicted in FIG. 7.

For example, the process may include, at 702, decoding a compute task request message received from a user equipment (UE), the compute task request message comprising an indication of a compute task to be offloaded to the RAN and data of the compute task.

The process further includes, at 704, establishing a RAN compute service function (SF) based on support initiated by a service orchestration and chaining function (SOCF).

The process further includes, at 706, establishing a RAN compute QoS flow with the UE, wherein the RAN compute QoS flow spans between the UE, the RAN, and the RAN compute SF.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

FIGS. 8-9 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and LI protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc, to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface. In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows. The MME 824 may implement mobility management functions to track a current location of the UE 802 to facilitate paging, bearer activation/deactivation, handovers, gateway selection, authentication, etc.

The SGW 826 may terminate an SI interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 8 36 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3rd party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHZ frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

The following examples pertain to further embodiments.

Example 1 may include a device comprising processing circuitry coupled to storage, the processing circuitry configured to: decode a compute task request message received from a user equipment (UE), the compute task request message comprising an indication of a compute task to be offloaded to the RAN and data of the compute task; establish a RAN compute service function (SF) based on support initiated by a service orchestration and chaining function (SOCF); and establish a RAN compute QoS flow with the UE, wherein the RAN compute QoS flow spans between the UE, the RAN, and the RAN compute SF.

Example 2 may include the device of example 1 and/or some other example herein, wherein the QoS flow may be established using a QoS flow identification (QFI) and a QoS profile.

Example 3 may include the device of example 2 and/or some other example herein, wherein the QoS profile may be provided by the SOCF to the RAN via a compute interface.

Example 4 may include the device of example 1 and/or some other example herein, wherein the processing circuitry may be further configured to map a RAN compute session on a per RAN compute SF basis.

Example 5 may include the device of example 1 and/or some other example herein, wherein the processing circuitry may be further configured to map a RAN compute session to multiple RAN compute SFs.

Example 6 may include the device of example 1 and/or some other example herein, wherein traffic associated with one or more RAN compute QoS flows may be mapped to one compute radio bearer.

Example 7 may include the device of example 1 and/or some other example herein, wherein the RAN compute SF may be assigned based on resource availability.

Example 8 may include the device of example 1 and/or some other example herein, wherein the processing circuitry may be further configured to encode a notification control message comprising information associated with QoS characteristics used for reconfiguring one or more compute radio bearers.

Example 9 may include the device of example 1 and/or some other example herein, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

Example 10 may include a computer-readable medium storing computer-executable instructions which when executed by one or more processors result in performing operations comprising: decoding a compute task request message received from a user equipment (UE), the compute task request message comprising an indication of a compute task to be offloaded to the RAN and data of the compute task; establishing a RAN compute service function (SF) based on support initiated by a service orchestration and chaining function (SOCF); and establishing a RAN compute QoS flow with the UE, wherein the RAN compute QoS flow spans between the UE, the RAN, and the RAN compute SF.

Example 11 may include the non-transitory computer-readable medium of example 10 and/or some other example herein, wherein the QoS flow may be established using a QoS flow identification (QFI) and a QoS profile.

Example 12 may include the non-transitory computer-readable medium of example 11 and/or some other example herein, wherein the QoS profile may be provided by the SOCF to the RAN via a compute interface.

Example 13 may include the non-transitory computer-readable medium of example 10 and/or some other example herein, wherein the operations further comprise map a RAN compute session on a per RAN compute SF basis.

Example 14 may include the non-transitory computer-readable medium of example 10 and/or some other example herein, wherein the operations further comprise map a RAN compute session to multiple RAN compute SFs.

Example 15 may include the non-transitory computer-readable medium of example 10 and/or some other example herein, wherein traffic associated with one or more RAN compute QoS flows may be mapped to one compute radio bearer.

Example 16 may include the non-transitory computer-readable medium of example 10 and/or some other example herein, wherein the RAN compute SF may be assigned based on resource availability.

Example 17 may include the non-transitory computer-readable medium of example 10 and/or some other example herein, wherein the operations further comprise encoding a notification control message comprising information associated with QoS characteristics used for reconfiguring one or more compute radio bearers.

Example 18 may include the non-transitory computer-readable medium of example 10 and/or some other example herein, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

Example 19 may include a method comprising: decoding a compute task request message received from a user equipment (UE), the compute task request message comprising an indication of a compute task to be offloaded to the RAN and data of the compute task; establishing a RAN compute service function (SF) based on support initiated by a service orchestration and chaining function (SOCF); and establishing a RAN compute QoS flow with the UE, wherein the RAN compute QoS flow spans between the UE, the RAN, and the RAN compute SF.

Example 20 may include the method of example 19 and/or some other example herein, wherein the QoS flow may be established using a QoS flow identification (QFI) and a QoS profile.

Example 21 may include the method of example 20 and/or some other example herein, wherein the QoS profile may be provided by the SOCF to the RAN via a compute interface.

Example 22 may include the method of example 19 and/or some other example herein, further comprising map a RAN compute session on a per RAN compute SF basis.

Example 23 may include the method of example 19 and/or some other example herein, further comprising map a RAN compute session to multiple RAN compute SFs.

Example 24 may include the method of example 19 and/or some other example herein, wherein traffic associated with one or more RAN compute QoS flows may be mapped to one compute radio bearer.

Example 25 may include the method of example 19 and/or some other example herein, wherein the RAN compute SF may be assigned based on resource availability.

Example 26 may include the method of example 19 and/or some other example herein, further comprising encoding a notification control message comprising information associated with QoS characteristics used for reconfiguring one or more compute radio bearers.

Example 27 may include the method of example 19 and/or some other example herein, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

Example 28 may include an apparatus comprising means for: decoding a compute task request message received from a user equipment (UE), the compute task request message comprising an indication of a compute task to be offloaded to the RAN and data of the compute task; establishing a RAN compute service function (SF) based on support initiated by a service orchestration and chaining function (SOCF); and establishing a RAN compute QoS flow with the UE, wherein the RAN compute QoS flow spans between the UE, the RAN, and the RAN compute SF.

Example 29 may include the apparatus of example 28 and/or some other example herein, wherein the QoS flow may be established using a QoS flow identification (QFI) and a QoS profile.

Example 30 may include the apparatus of example 29 and/or some other example herein, wherein the QoS profile may be provided by the SOCF to the RAN via a compute interface.

Example 31 may include the apparatus of example 28 and/or some other example herein, further comprising map a RAN compute session on a per RAN compute SF basis.

Example 32 may include the apparatus of example 28 and/or some other example herein, further comprising map a RAN compute session to multiple RAN compute SFs.

Example 33 may include the apparatus of example 28 and/or some other example herein, wherein traffic associated with one or more RAN compute QoS flows may be mapped to one compute radio bearer.

Example 34 may include the apparatus of example 28 and/or some other example herein, wherein the RAN compute SF may be assigned based on resource availability.

Example 35 may include the apparatus of example 28 and/or some other example herein, further comprising encoding a notification control message comprising information associated with QoS characteristics used for reconfiguring one or more compute radio bearers.

Example 36 may include the apparatus of example 28 and/or some other example herein, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

Example 37 may include an apparatus comprising means for performing any of the methods of examples 1-36.

Example 38 may include a network node comprising a communication interface and processing circuitry connected thereto and configured to perform the methods of examples 1-36.

Example 39 may include an apparatus comprising means to perform one or more elements of a method described in or related to any of examples 1-36, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 41 may include an apparatus comprising logic, modules, or circuitry to perform one or more elements of a method described in or related to any of examples 1-36, or any other method or process described herein.

Example 42 may include a method, technique, or process as described in or related to any of examples 1-36, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 44 may include a signal as described in or related to any of examples 1-36, or portions or parts thereof.

Example 45 may include a datagram, packet, frame, segment, protocol data unit (PDU), or message as described in or related to any of examples 1-36, or portions or parts thereof, or otherwise described in the present disclosure.

Example 46 may include a signal encoded with data as described in or related to any of examples 1-36, or portions or parts thereof, or otherwise described in the present disclosure.

Example 47 may include a signal encoded with a datagram, packet, frame, segment, protocol data unit (PDU), or message as described in or related to any of examples 1-36, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 49 may include a computer program comprising instructions, wherein execution of the program by a processing element is to cause the processing element to carry out the method, techniques, or process as described in or related to any of examples 1-36, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

TABLE 2

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |

TABLE 2-continued

| Abbreviations: | |
|---|---|
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |

TABLE 2-continued

| Abbreviations: | |
|---|---|
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |

TABLE 2-continued

| Abbreviations: | |
|---|---|
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Nex Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |

TABLE 2-continued

| Abbreviations: | |
|---|---|
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |

TABLE 2-continued

| Abbreviations: | |
|---|---|
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |

TABLE 2-continued

| Abbreviations: | |
|---|---|
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |

TABLE 2-continued

| Abbreviations: | |
|---|---|
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |

TABLE 2-continued

| Abbreviations: | |
|---|---|
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit—type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |

TABLE 2-continued

| Abbreviations: | |
|---|---|
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |

TABLE 2-continued

| Abbreviations: | |
|---|---|
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |

TABLE 2-continued

| Abbreviations: | |
|---|---|
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |

TABLE 2-continued

| Abbreviations: | |
|---|---|
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |

TABLE 2-continued

| Abbreviations: | |
|---|---|
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™, Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term “data element” or “element” as used herein refers to a unit that is indivisible at a given level of abstraction and has a clearly defined boundary. A data element is a logical component of an information object (e.g., electronic document) that may begin with a start tag (e.g., “<element>”) and end with a matching end tag (e.g., “</element>”), or only has an empty element tag (e.g., “<element/>”). Any characters between the start tag and end tag, if any, are the element’s content (referred to herein as “content items” or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., “<element>content item</element>”), attributes (e.g., “<element attribute=”attributeValue“>”), and other elements “child elements” (e.g., “<element1><element2>content item</element2></element1>”). An “attribute” may refer to a markup construct including a name-value pair that exists within a start tag or empty element tag. Attributes contain data related to its element and/or control the element’s behavior.

The term “channel” as used herein refers to any transmission medium, either tangible or intangible, which is used to communicate data or a data stream. The term “channel” may be synonymous with and/or equivalent to “communications channel,” “data communications channel,” “transmission channel,” “data transmission channel,” “access channel,” “data access channel,” “link,” “data link,” “carrier,” “radiofrequency carrier,” and/or any other like term denoting a pathway or medium through which data is communicated. Additionally, the term “link” as used herein refers to a connection between two devices through a RAT for the purpose of transmitting and receiving information. As used herein, the term “radio technology” refers to technology for wireless transmission and/or reception of electromagnetic radiation for information transfer. The term “radio access technology” or “RAT” refers to the technology used for the underlying physical connection to a radio based communication network. As used herein, the term “communication protocol” (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term “radio technology” refers to technology for wireless transmission and/or reception of electromagnetic radiation for information transfer. The term “radio access technology” or “RAT” refers to the technology used for the underlying physical connection to a radio based communication network. As used herein, the term “communication protocol” (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term “access network” refers to any network, using any combination of radio technologies, RATs, and/or communication protocols, used to connect user devices and service providers. In the context of WLANs, an “access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Syncrhonization Signal (PSS), a Secondary Syncrhonization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC-_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the near-RT RIC function, and hence the RAN, towards better fulfilment of the RAN intent.

The term "A1 Enrichment information" refers to information utilized by near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit-Control Plane" or "O-CU-CP" refers to a logical node hosting the RRC and the control plane part of the PDCP protocol.

The term "O-RAN Central Unit-User Plane" or "O-CU-UP" refers to a logical node hosting the user plane part of the PDCP protocol and the SDAP protocol.

The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of AI policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the near-RT RIC setting up or updating Traffic Steering aware resource optimization procedure based on information from A1 Policy setup or update, AI Enrichment Information (EI) and/or outcome of Near-RT RIC evaluation, which includes the initial configuration (preconditions) and injection of related AI policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term “Traffic Steering Target” refers to the intended performance result that is desired from the network, which is configured to Near-RT RIC over O1.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C #, “C”, Kotlin, Swift, Rust, Go (or “Golang”), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

What is claimed is:

1. An apparatus for a radio access network (RAN), the apparatus comprising:
- processing circuitry configured to:
  - decode a compute task request message received from a user equipment (UE), the compute task request message comprising an indication of a compute task to be offloaded to the RAN and data of the compute task;
  - establish a RAN compute service function (SF) at a base station of the RAN based on support initiated by a service orchestration and chaining function (SOCF), wherein the support initiated by the SOCF comprises providing a packet filter associated with the RAN compute SF to the apparatus;
  - establish a RAN compute QoS flow with the UE by configuring a dedicated compute data radio bearer spanning between the UE, the RAN, and the RAN compute SF; and
  - map packets of the compute task to the RAN compute QoS flow based on the packet filter; and
- a memory configured to store information of the compute task.

2. The apparatus of claim 1, wherein the QoS flow is established using a QoS flow identification (QFI) and a QoS profile.

3. The apparatus of claim 2, wherein the QoS profile is provided by the SOCF to the RAN via a compute interface.

4. The apparatus of claim 1, wherein the processing circuitry is further configured to map a RAN compute session on a per RAN compute SF basis.

5. The apparatus of claim 1, wherein the processing circuitry is further configured to map a RAN compute session to multiple RAN compute SFs.

6. The apparatus of claim 1, wherein traffic associated with one or more RAN compute QoS flows is mapped to one compute radio bearer.

7. The apparatus of claim 1, wherein the RAN compute SF is assigned based on resource availability.

8. The apparatus of claim 1, wherein the processing circuitry is further configured to encode a notification control message comprising information associated with QoS characteristics used for reconfiguring one or more compute radio bearers.

9. The apparatus of claim 1, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

10. A non-transitory computer-readable medium storing computer-executable instructions which when executed by one or more processors result in performing operations comprising:
- decoding a compute task request message received from a user equipment (UE), the compute task request message comprising an indication of a compute task to be offloaded to a radio access network (RAN) and data of the compute task;
- establishing a RAN compute service function (SF) at a base station of the RAN based on support initiated by a service orchestration and chaining function (SOCF), wherein the support initiated by the SOCF comprises providing a packet filter associated with the RAN compute SF to a RAN apparatus;
- establishing a RAN compute QoS flow with the UE, wherein the RAN compute Qos flow spans between the UE, the RAN, and the RAN compute SF; and
- mapping packets of the compute task to the RAN compute QoS flow based on the packet filter.

11. The non-transitory computer-readable medium of claim 10, wherein the QoS flow is established using a QoS flow identification (QFI) and a QoS profile.

12. The non-transitory computer-readable medium of claim 11, wherein the QoS profile is provided by the SOCF to the RAN via a compute interface.

13. The non-transitory computer-readable medium of claim 10, wherein the operations further comprise map a RAN compute session on a per RAN compute SF basis.

14. The non-transitory computer-readable medium of claim 10, wherein the operations further comprise map a RAN compute session to multiple RAN compute SFs.

15. The non-transitory computer-readable medium of claim 10, wherein traffic associated with one or more RAN compute QoS flows is mapped to one compute radio bearer.

16. The non-transitory computer-readable medium of claim 10, wherein the RAN compute SF is assigned based on resource availability.

17. The non-transitory computer-readable medium of claim 10, wherein the operations further comprise encoding a notification control message comprising information associated with QoS characteristics used for reconfiguring one or more compute radio bearers.

18. The non-transitory computer-readable medium of claim 10, wherein the SOCF provides assistance information to a RAN compute control function (CF), wherein the assistance information comprises at least one of a mapping method for QoS flows to bearers, an expected periodicity of traffic, a multi-homing support, a packet filter along with a UE ID, a compute session ID, or a service ID.

19. A method comprising:

decoding a compute task request message received from a user equipment (UE), the compute task request message comprising an indication of a compute task to be offloaded to a radio access network (RAN) and data of the compute task;

establishing a RAN compute service function (SF) based on support initiated by a service orchestration and chaining function (SOCF), wherein the support initiated by the SOCF comprises providing a packet filter associated with the RAN compute SF to a RAN node;

establishing a RAN compute QoS flow with the UE, wherein the RAN compute QoS flow spans between the UE, the RAN, and the RAN compute SF; and mapping packets of the compute task to the RAN compute QoS flow based on the packet filter.

20. The method of claim 19, wherein the QoS flow is established using a Qos flow identification (QFI) and a QoS profile.

* * * * *